United States Patent
Son et al.

(10) Patent No.: US 10,651,497 B2
(45) Date of Patent: May 12, 2020

(54) APPARATUS AND METHOD FOR PREPARING SLURRY FOR SECONDARY BATTERY

(71) Applicant: LG Chem, Ltd., Seoul (KR)

(72) Inventors: Jin Young Son, Daejeon (KR); Hyung Suk Cho, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 175 days.

(21) Appl. No.: 15/741,023

(22) PCT Filed: Mar. 20, 2017

(86) PCT No.: PCT/KR2017/002961
§ 371 (c)(1),
(2) Date: Dec. 29, 2017

(87) PCT Pub. No.: WO2017/175990
PCT Pub. Date: Oct. 12, 2017

(65) Prior Publication Data
US 2018/0191019 A1    Jul. 5, 2018

(30) Foreign Application Priority Data

Apr. 4, 2016 (KR) .................. 10-2016-0041157

(51) Int. Cl.
| | |
|---|---|
| H01M 4/04 | (2006.01) |
| H01M 10/04 | (2006.01) |
| B01F 3/12 | (2006.01) |
| B01F 15/00 | (2006.01) |
| H01M 4/139 | (2010.01) |

(52) U.S. Cl.
CPC .............. *H01M 10/04* (2013.01); *B01F 3/12* (2013.01); *B01F 3/1221* (2013.01); *B01F 15/00201* (2013.01); *H01M 4/04* (2013.01); *H01M 4/139* (2013.01); *B01F 2003/1257* (2013.01); *H01M 4/0416* (2013.01)

(58) Field of Classification Search
None
See application file for complete search history.

(56) References Cited

U.S. PATENT DOCUMENTS

2013/0193371 A1    8/2013   Sumi et al.

FOREIGN PATENT DOCUMENTS

| | | |
|---|---|---|
| JP | 2004303572 A | 10/2004 |
| JP | 2006107896 A | 4/2006 |
| JP | 2013157257 A | 8/2013 |

(Continued)

OTHER PUBLICATIONS

Search report from International Application No. PCT/KR2017/002961, dated Jun. 23, 2017.

*Primary Examiner* — Jeremiah R Smith
(74) *Attorney, Agent, or Firm* — Lerner, David, Littenberg, Krumholz & Mentlik, LLP

(57) ABSTRACT

Disclosed are an apparatus and method for preparing slurry for a secondary battery.

According to the present invention, a solvent is intermittently injected into a mixer for preparing the slurry to measure a torque value applied to the mixer and thereby to obtain a maximum value of the torque value applied to the mixer. Then, a kneading point that is a mixing ratio of the powder and the solvent, which are used for preparing the slurry, is calculated to determine an optimized kneading point without error and through an automatic process.

1 Claim, 2 Drawing Sheets

(56) References Cited

FOREIGN PATENT DOCUMENTS

| | | |
|---|---|---|
| JP | 2013161542 A | 8/2013 |
| JP | 2014143080 A | 8/2014 |
| JP | 2015032369 A | 2/2015 |

APPARATUS AND METHOD FOR PREPARING SLURRY FOR SECONDARY BATTERY

CROSS-REFERENCE TO RELATED APPLICATION

The present application is a national phase entry under 35 U.S.C. § 371 of International Application No. PCT/KR2017/002961, filed Mar. 20, 2017, which claims priority from Korean Patent Application No. 10-2016-0041157, filed on Apr. 4, 2016, the disclosures of which are incorporated herein by reference.

TECHNICAL FIELD

The present invention relates to an apparatus and method for preparing slurry for secondary battery.

BACKGROUND ART

Secondary batteries that are repeatedly chargeable and dischargeable are used in various electronic devices. As types and shapes of electronic devices have become various, secondary batteries mounted on electronic devices have also been diversified in shape. Recently, lithium ion secondary batteries using lithium as secondary batteries have been widely used.

To manufacture such a secondary battery, a negative electrode coated with a negative electrode active material, a positive electrode coated with a positive electrode active material, and a separator disposed between the negative electrode and the positive electrode are required. Particularly, to prepare the negative electrode active material and the positive electrode active material, which constitute the secondary battery, a mixture of an electrode active material, a conductive agent, and a binder, which is called slurry, is often required.

To prepare such slurry, a process of mixing powder and a solvent is required, and the mixing occurs in a mixer. Particularly, to prepare the slurry, a mixing ratio of the powder and the solvent is important. Thus, the mixing ratio of the powder and the solvent, which is performed for preparing the slurry, is called a kneading point. In the slurry preparation step, the powder and the solvent are mixed in the mixer for a predetermined time at the kneading point and then used as a material for the secondary battery.

However, the kneading point may vary according to materials and contents of the powder and the solvent, which are necessary for preparing the slurry. Also, the kneading point may vary according to a size and structure of the mixer that is used for preparing the slurry.

When the slurry is manufactured in the mixer, a worker often checks the inside of the mixer so as to determine the kneading point according to the related art. In this process, external impurities may be frequently introduced into the mixer, and thus, the slurry be deteriorated in quality. In addition, it is difficult to determine an optimum kneading point because an error surely occurs due to the direct check of the inside of the mixer by the human worker.

DISCLOSURE OF THE INVENTION

Technical Problem

Accordingly, an object of the present invention is to determine a kneading point without directly checking the inside of a mixer during a slurry preparation process to prevent external impurities from being introduced into slurry, thereby improving quality of the slurry used for preparing a secondary battery.

Another object of the present invention is to provide a standardized apparatus and method for determining a kneading point during a slurry preparation process to determine an optimized kneading point.

Technical Solution

According to an aspect of the present invention so as to achieve the abovementioned object, a method for preparing slurry for a secondary battery includes: a powder injection step of injecting powder for preparing the slurry, which is used for manufacturing the secondary battery, into a mixer for preparing the slurry; a data collection step of measuring a torque value applied to the mixer after injecting a solvent into the mixer; and a calculation step of calculating a kneading point that is a mixing ratio of the powder and the solvent, which are used for preparing the slurry, by using the torque value collected in the data collection step.

The data collection step may include: a solvent injection step of injecting the solvent into the mixer; and a torque measuring step of measuring the torque value applied to the mixer, wherein the solvent injection step and the torque measuring step may be alternately performed to measure a plurality of torque values applied to the mixer.

The method may further include a storage step, which is performed between the data collection step and the calculation step to store a maximum torque value of the plurality of torque values collected in the data collection step.

The method may further include a kneading point reaching step of additionally injecting the solvent into the mixer until the mixing ratio reaches the kneading point.

In the calculation step, the kneading point may be a mixing ratio of the powder and the solvent when the torque value applied to the mixer reaches a torque value corresponding to a predetermined ratio of the maximum torque value.

The predetermined ratio may range from 30% to 50%.

According to another aspect of the present invention so as to achieve the abovementioned object, an apparatus for preparing slurry for a secondary battery includes: a mixer in which powder and a solvent, which are used for preparing the slurry used for manufacturing the secondary battery, are mixed with each other; a solvent injection adjusting unit which injects the solvent into the mixer; a torque meter which measures torque applied to the mixer while the powder and the solvent are mixed with each other; a storage unit which stores the torque values measured in the torque meter; and a calculation unit which calculates a kneading point that is a mixing ratio of the powder and the solvent, which are used for preparing the slurry, by using a maximum torque value of the torque values stored in storage unit, wherein the solvent injection adjusting unit injects the solvent into the mixer at time intervals, and the torque meter measures the torque applied to the mixer in the state in which the solvent injection adjusting unit injects the solvent into the mixer.

The solvent injection adjusting unit may additionally inject the solvent into the mixer until the mixing ratio reaches the kneading point.

The kneading point may be a mixing ratio of the powder and the solvent when the torque value applied to the mixer reaches a torque value corresponding to a predetermined ratio of the maximum torque value.

The predetermined ratio may range from 30% to 50%.

Advantageous Effects

According to the present invention, the kneading point may be determined without directly checking the inside of the mixer during the slurry preparation process to prevent the external impurities from being introduced into the slurry, thereby improving quality of the slurry used for preparing the secondary battery.

According to another object of the present invention, the standardized apparatus and method for determining the kneading point during the slurry preparation process may be provided to determine the optimized kneading point.

MODE FOR CARRYING OUT THE INVENTION

Hereinafter, the present invention will be described in detail with reference to the accompanying drawings. However, the present invention is not limited to the embodiments below.

To manufacture a secondary battery that is repeatedly chargeable and dischargeable, a negative electrode coated with a negative electrode active material, a positive electrode coated with a positive electrode active material, and a separator disposed between the negative electrode and the positive electrode are required. Particularly, to manufacture the negative electrode active material and the positive electrode active material, which constitute the secondary battery, a mixture of an electrode active material, a conductive agent, and a binder, which is called slurry, has to be previously prepared.

The slurry is prepared through mixing of powder and a solvent. That is, the powder and the solvent are put into a mixer for preparing slurry (hereinafter, referred to a 'mixer') to prepare the slurry. Thus, in the slurry preparation process, a mixing ratio of the powder and the solvent and the role of the mixer for mixing the powder and the solvent are very important.

Figure 1:
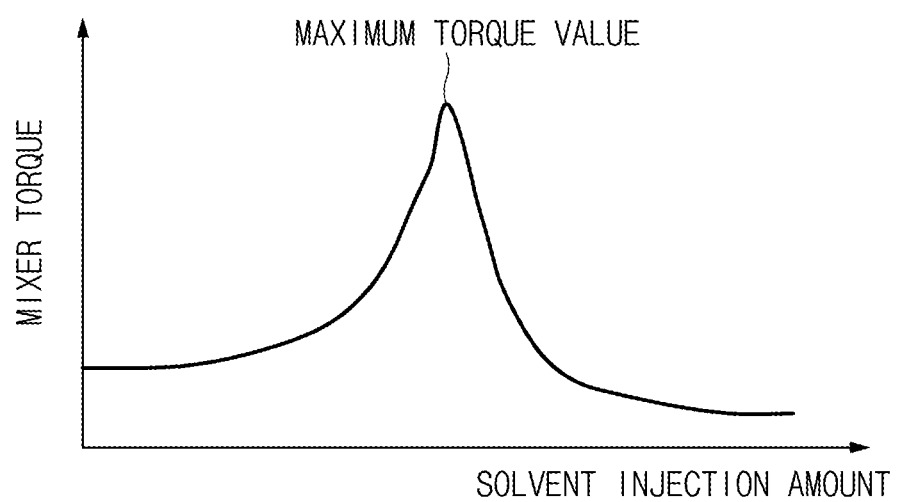
FIG. 1 is a graph illustrating a variation in torque applied to a mixer according to an amount of solvent injected during a slurry preparation process.

While the powder and the solvent are mixed with each other by using the mixer, the powder absorbs the solvent. Thus, the mixture of the powder and the solvent has viscosity. Thus, while the powder and the solvent are mixed with each other, torque is applied to the mixer. FIG. 1 is a graph illustrating a variation in torque applied to a mixer according to an amount of solvent injected during a slurry preparation process.

In more detail, FIG. 1 is a graph illustrating a variation in torque applied to a mixer by gradually injecting a solvent after powder is put into the mixer. As illustrated in FIG. 1, when an injected amount of solvent increases, the powder absorbs the solvent. As a result, the mixture of the powder and the solvent has viscosity, and thus, a torque value applied to the mixer increases. This tendency is continuous until the torque value is maximized. Thereafter, an amount of solvent relatively increases, and thus, the mixture of the powder and the solvent decreases in viscosity. Thus, the torque value may also decrease.

As described above, the present invention has a feature in which an optimized kneading point is provided without directly checking the inside of the mixer during the slurry preparation process. The kneading point may be a mixing ratio of the powder and the solvent so as to prepare the slurry. The mixer mixes the powder with the solvent at the kneading point to prepare the slurry. According to the present invention, the powder is put into the mixer, and then, the solvent is put at a time interval (i.e., intermittently) to measure a torque value applied to the mixer and calculate a kneading point based on the torque value.

For this, according to an embodiment of the present invention, an apparatus for preparing slurry includes a mixer for mixing powder with a solvent to prepare slurry used for manufacturing a secondary battery, a solvent injection adjusting unit for injecting the solvent into the mixer, a torque meter for measuring torque applied to the mixer while the powder and the solvent are mixed with each other, a storage unit for storing a torque value measured in the torque meter, and a calculation unit for calculating a kneading point, which is a mixing ratio of the powder and the solvent so as to prepare the slurry, by using a maximum torque value of the torque value stored in the storage unit. Hereinafter, each of the constituents will be described in detail.

The solvent injection adjusting unit injects the solvent several times into the mixer at time intervals. That is, the solvent injection adjusting unit intermittently injects the solvent into the mixer in which the powder is previously injected.

When the solvent is injected into the mixer by the solvent injection adjusting unit, the torque meter measures torque applied to the mixer in the state in which the solvent is injected into the mixer. Here, as described above, since the solvent injection adjusting unit injects the solvent into the mixer several times at time intervals, the toque meter may also measure torque applied to the mixer several times. For example, when the solvent injection adjusting unit injects the solvent into the mixer four times, the torque meter may measure torque applied to the mixer four times. The torque values measured by the torque meter are stored in the storage unit as described above.

According to the present invention, the kneading point is calculated based on the maximum torque value of the plurality of torque values stored in the storage unit. That is, according to the present invention, the kneading point may be a mixing ratio of the powder and the solvent, which corresponds to a torque value corresponding to a predetermined ratio of the maximum torque value of the plurality of torque values stored in the storage unit. Here, the predetermined ratio may be a value belonging to a range of 30% to 50%. When the mixing ratio corresponding to the maximum torque value of the plurality of torque values stored in the storage unit is the kneading point, the mixture of the powder and the solvent may have excessively large viscosity, and thus, it may be difficult to adequately mix the powder with the solvent within the mixer. Thus, the mixing ratio of the powder and the solvent, which corresponds to the predetermined ratio of the maximum torque value, may be calculated as the kneading point to adequately mix the powder with the solvent. According to the present invention, when the predetermined ratio belongs to the range of 30% to 50%, the powder and the solvent may be adequately mixed with each other to prepare optimized slurry.

Hereinafter, a method for preparing slurry for the secondary battery according to an embodiment of the present invention will be described.

Figure 2:
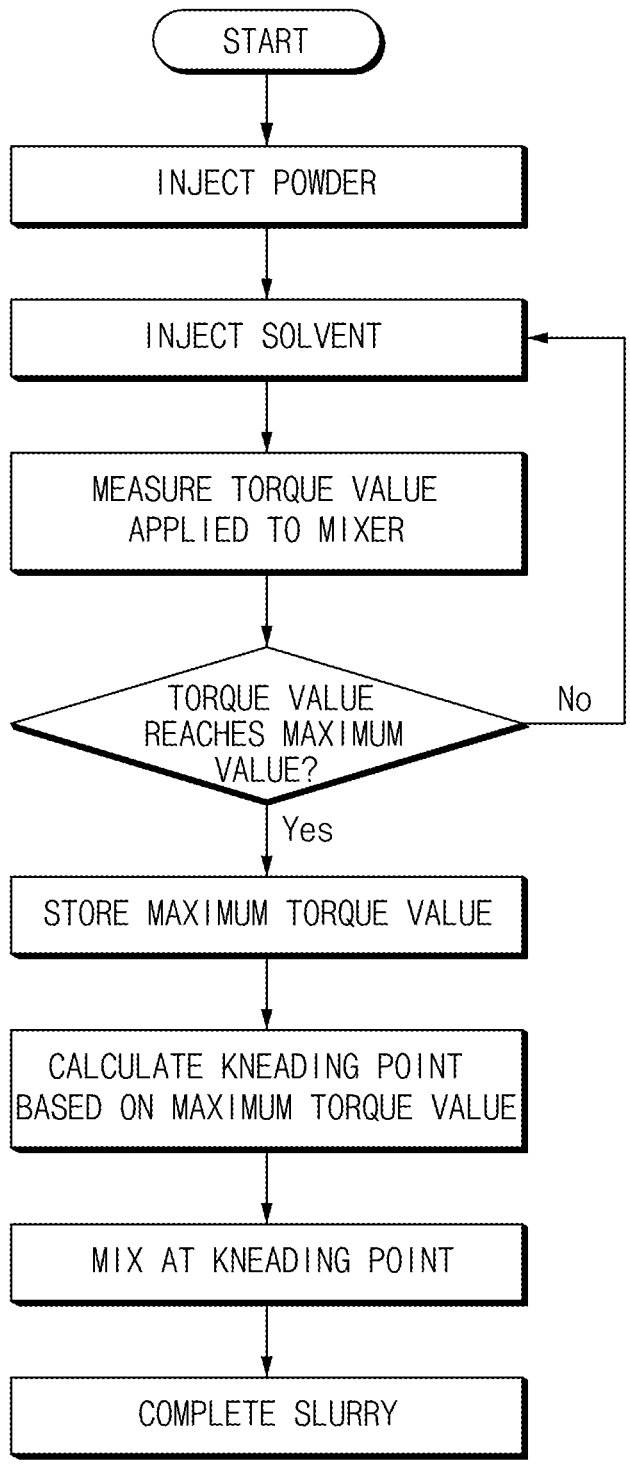
FIG. 2 is a flowchart illustrating a method for preparing slurry for a secondary battery according to the present invention.

FIG. 2 is a flowchart illustrating a method for preparing slurry for a secondary battery according to the present invention.

Referring to FIG. 2, a powder injection step of injecting powder into a mixer so as to prepare slurry used for manufacturing a secondary battery is performed. Thereafter, a data collection step of measuring a torque value applied to the mixer while the solvent and the powder are mixed with each other through the mixer after injecting the solvent into the mixer; and a calculation step of calculating a kneading point that is a mixing ratio of the powder and the solvent, which are used for preparing slurry, by using the torque value collected in the data collection step are successively performed.

Here, the data collection step includes a solvent injection step of injecting the solvent into the mixer and a torque measuring step of measuring the torque value applied to the mixer. Here, as described above, in the solvent injection adjusting unit, the solvent is injected into the mixer several times at time intervals, and the torque meter measures the torque value applied to the mixer several times. Thus, the solvent injection step and the torque measuring step are alternately performed.

According to the present invention, the method for preparing the slurry may further include a storage step which is performed between the data collection step and the calculation step and stores a maximum torque value of the plurality of torque values collected in the data collection step. The maximum torque value stored in the storage step is used for calculating the kneading point that is the mixing ratio of the powder and the solvent.

The kneading point according to the present invention is a mixing ratio of the powder and the solvent when the torque value applied to the mixer reaches a predetermined ratio of the maximum torque value stored in the storage step. Here, the predetermined ratio may be a value belonging to a range of 30% to 50%. The mixing within the mixer may be smoothly performed when the mixing ratio of the powder and the solvent reaches a torque value corresponding to the range of 30% to 50% of the maximum torque value.

When the kneading point is calculated, a kneading point reaching step of additionally injecting the solvent into the mixer until the mixing ratio reaches the kneading point is performed. When the mixing ratio of the powder and the solvent within the mixer reaches the kneading point through the kneading point reaching step, the powder and the solvent are mixed at the kneading point in the mixer to prepare the slurry used for manufacturing the secondary battery.

The invention claimed is:

1. A method for preparing slurry for a secondary battery, the method comprising:
    injecting powder for preparing the slurry, which is used for manufacturing the secondary battery, into a mixer for preparing the slurry;
    measuring a torque value applied to the mixer after injecting a solvent into the mixer and collecting a plurality of torque values;
    calculating a kneading point that is a mixing ratio of the powder and the solvent, which are used for preparing the slurry, by using the plurality of torque values collected;
    storing a maximum torque value of the plurality of torque values, wherein the storing is performed between the collecting the plurality of torque values and the calculation of the kneading point; and
    additionally injecting the solvent into the mixer until the mixing ratio reaches the kneading point;
    wherein, the kneading point is a mixing ratio of the powder and the solvent when the torque value applied to the mixer reaches a torque value corresponding to a predetermined ratio of the maximum torque value,
    wherein the collecting the plurality of torque values comprises:
    injecting the solvent into the mixer; and
    measuring the torque value applied to the mixer,
    wherein the injecting solvent and the measuring the torque value are alternately performed to measure the plurality of torque values applied to the mixer, and
    wherein the predetermined ratio ranges from 30% to 50%.

* * * * *